(12) United States Patent
Miao

(10) Patent No.: US 7,450,593 B2
(45) Date of Patent: Nov. 11, 2008

(54) CLOCK DIFFERENCE COMPENSATION FOR A NETWORK

(75) Inventor: Kai Miao, Boonton, NJ (US)

(73) Assignee: Intel Corporation, Santa Clara, CA (US)

(*) Notice: Subject to any disclaimer, the term of this patent is extended or adjusted under 35 U.S.C. 154(b) by 1317 days.

(21) Appl. No.: 10/602,184

(22) Filed: Jun. 23, 2003

(65) Prior Publication Data

US 2004/0258047 A1    Dec. 23, 2004

(51) Int. Cl.
*H04J 3/06* (2006.01)
*H04L 12/56* (2006.01)

(52) U.S. Cl. .................. 370/395.62; 370/517

(58) Field of Classification Search ............ 370/395.62, 370/503, 516, 517, 519
See application file for complete search history.

(56) References Cited

U.S. PATENT DOCUMENTS

| | | | |
|---|---|---|---|
| 6,452,950 B1 * | 9/2002 | Ohlsson et al. | 370/516 |
| 6,862,298 B1 * | 3/2005 | Smith et al. | 370/516 |
| 6,901,270 B1 * | 5/2005 | Beach | 455/563 |
| 7,263,109 B2 * | 8/2007 | Ternovsky | 370/503 |
| 7,308,004 B1 * | 12/2007 | Duvvuru | 370/484 |

* cited by examiner

*Primary Examiner*—Harry S Hong
(74) *Attorney, Agent, or Firm*—Christopher K. Gagne

(57) ABSTRACT

A method and apparatus to perform clock compensation for a jitter buffer are described.

29 Claims, 5 Drawing Sheets

CLOCK DIFFERENCE COMPENSATION FOR A NETWORK

BACKGROUND

A Voice Over Packet (VOP) system may communicate audio information over a packet network as a stream of audio packets. An example of audio information may be information from a telephone call. Information from a telephone call may follow a certain temporal pattern. The temporal pattern may be disrupted, however, as audio packets travel through the packet network. Disruption of the temporal pattern may degrade the quality of the telephone call. Consequently, there may be need for improved techniques to recover the temporal pattern of an audio packet stream in a device or network.

BRIEF DESCRIPTION OF THE DRAWINGS

The subject matter regarded as the embodiments is particularly pointed out and distinctly claimed in the concluding portion of the specification. The embodiments, however, both as to organization and method of operation, together with objects, features, and advantages thereof, may best be understood by reference to the following detailed description when read with the accompanying drawings in which:

DETAILED DESCRIPTION

It is worthy to note that any reference in the specification to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Numerous specific details may be set forth herein to provide a thorough understanding of the embodiments. It will be understood by those skilled in the art, however, that the embodiments may be practiced without these specific details. In other instances, well-known methods, procedures, components and circuits have not been described in detail so as not to obscure the embodiments. It can be appreciated that the specific structural and functional details disclosed herein may be representative and do not necessarily limit the scope of the embodiments.

Figure 1:
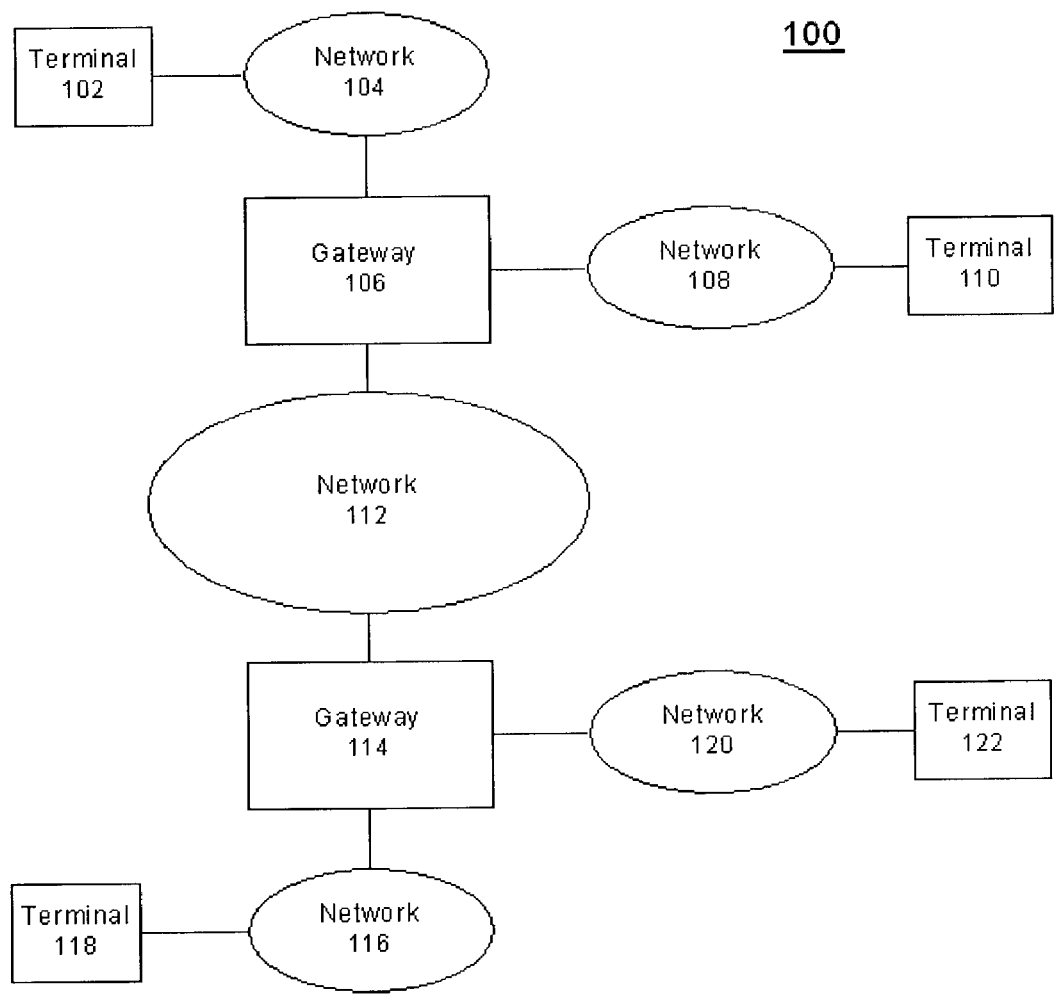
FIG. 1 illustrates a network suitable for practicing one embodiment.

Referring now in detail to the drawings wherein like parts are designated by like reference numerals throughout, there is illustrated in FIG. 1 a network suitable for practicing one embodiment. FIG. 1 is a block diagram of a network 100. An example of network 100 may be a VOP network. Network 100 may comprise a number of network nodes connected by various communications mediums. A network node in this context may include any device capable of communicating information, such as a call terminal, computer, server, switch, router, bridge, gateway, personal digital assistant (PDA), mobile device, and so forth. Examples of a communications medium may include any medium capable of carrying information signals, such as twisted-pair wire, co-axial cable, fiber optics, radio frequencies (RF), liquids and so forth. It may be further appreciated that the terms "connection" and "interconnection," and variations thereof, in this context may refer to physical connections and/or logical connections. Although FIG. 1 shows a limited number of network nodes for clarity, it can be appreciated that any number of network nodes may be used in network 100 and still fall within the scope of the embodiments.

The embodiments may be implemented as part of network 100, for example. The embodiments may relate to VOP systems in general. More particularly, the embodiments may relate to techniques for compensating for time differences between various clocks used in a VOP system. This may be particularly useful for implementing a jitter buffer. A jitter buffer attempts to maintain the temporal pattern for audio information by compensating for random network latency incurred by the packets. The term "audio information" as used herein may refer to any data communicated during a telephone call, such as speech, speech utterances, silent periods, background noise, comfort noise, tones, music, control signals and so forth. The terms "network latency" or "network delay" as used herein may refer to the delay incurred by a packet as it is transported between two end points. The term "temporal pattern" as used herein may refer to the timing pattern of a conventional speech conversation between multiple parties, or one party and an automated system such as an Interactive Voice Response (IVR) system. Improvements in jitter buffer techniques may improve the quality of a telephone call over a packet network. As a result, the end user may experience better packet telephony services at a reduced cost.

A jitter buffer may compensate for packets having varying amounts of network latency as they arrive at a receiver. A transmitter typically sends audio information in sequential packets to the receiver. The packets may take different paths through the network, or may be randomly delayed along the same path due to changing network conditions. As a result, the sequential packets may arrive at the receiver at different times and often out of order. This may affect the temporal pattern of the audio information as it is played out to the listener. A jitter buffer attempts to compensate for the effects of network latency by adding a certain amount of delay to each packet prior to sending them to a voice coder/decoder ("codec"). The added delay gives the receiver time to place the packets in the proper sequence, and also to smooth out gaps between packets to maintain the original temporal pattern. The amount of delay added to each packet may vary according to a given jitter buffer delay algorithm, examples of which may be discussed in more detail below.

The performance of a jitter buffer may be particularly affected by clock differentials. The term "clock differential" may refer to differences in time between two or more timing devices, such as a transmitter clock and a receiving clock, for example. A jitter buffer may operate more efficiently when the transmitter clock and the receiving clock are synchronized. Techniques to synchronize the clocks are typically expensive in terms of processing cycles and resources. In lieu of synchronizing the clocks, many jitter buffer algorithms approximate the clock differential. The approximations, however, may be inaccurate. Consequently, there may be a substantial need for techniques to improve clock differential compensation for a jitter buffer.

One embodiment attempts to perform clock differential compensation for a jitter buffer. A receiver may receive a plurality of packets with audio information sent using a first timing signal. The first timing signal may be from a transmitter clock, for example. The receiver may attempt to reproduce the audio information using a second timing signal. The second timing signal may be from a receiver clock, for example. The receiver may compensate for the time differences between the first and second timing signals using a Jitter Buffer Module (JBM) having a circular buffer and a variable read out position for the buffer.

Referring again to FIG. 1, network 100 may include network nodes 102, 110, 118 and 122. In one embodiment, network nodes 102, 110, 118 and 122 may be call terminals. A call terminal may comprise any device capable of communicating audio information, such as a telephone, a packet telephone, a mobile or cellular telephone, a processing system equipped with a modem or Network Interface Card (NIC), and so forth. In one embodiment, the call terminals may have a microphone to receive analog voice signals from a user, and a speaker to reproduce analog voice signals received from another call terminal.

Network 100 may also include various types of networks, such as networks 104, 108, 112, 116 and 120. In one embodiment, networks 104 and 116 may be voice networks. The term "voice network" may refer to a circuit-switched network, such as the Public Switched Telephone Network (PSTN). A circuit-switched network typically establishes a dedicated communications channel or circuit between call terminals. In one embodiment, networks 108, 112 and 120 may be data networks. The term "data network" may refer to a packet network, such as the Internet. Packet networks may be described in more detail below.

In one embodiment, the networks may comprise wired networks or wireless networks. In the latter case, the network nodes may be equipped with wireless transmitters/receivers ("transceivers") and accompanying components. Further, the wireless transceivers may be connected to directional or omni-directional antennas to communicate signals from the wireless transceivers over the RF.

In one embodiment, networks 108, 112 and 120 may comprise packet networks. A packet network may comprise one or more network nodes that communicate information as a stream of relatively short packets. A packet in this context may refer to a set of information of a limited length, with the length typically represented in terms of bits or bytes. In general operation, a network node may receive the audio information, and break it up into a series of audio packets. Each packet may comprise a portion of the audio information and control information. The network node may then send the audio packets in sequence to another network node. This process may be repeated until the entire series of packets exit the network or reaches their intended destination.

Each network in network 100 may communicate audio packets in accordance with one or more communications protocols. A protocol may comprise a set of instructions, rules or specifications by which the information signals are communicated over the communications medium. In one embodiment, for example, networks 108, 112 and 120 may operate in accordance with, for example, one or more Internet protocols. Further, packet networks 108, 112, and 120 may also include the appropriate interfaces to circuit-switched networks such as networks 104 and 116, and vice-versa.

In one embodiment, network 100 may further comprise network nodes 106 and 114. In one embodiment, networks node 106 and 114 may comprise gateways or media gateways. Media gateways 106 and 114 may operate to convert a conventional telephony call to a packet telephony call or VOP call. For example, media gateways 106 and 114 may receive signals from a circuit-switched network, such as networks 104 and 116, and convert the circuit-switched signals into packets. The conversion to packets may be made in accordance with, for example, the RTP Specification, SIP Specification, H.323 Specification, Megaco Specification or other packet protocol. Media gateways 106 and 114 may also receive signals from a packet network, such as networks 108, 112 and 120, and convert the packets into circuit-switched signals or pass them to another packet network.

Network 100 may complete a telephone call between call terminals, such as call terminals 102, 110, 118 and 122. The communication path between certain call terminals may comprise both circuit-switched networks and packet networks, as demonstrated by a telephone call between call terminals 102 and 118, for example. The communication path between certain call terminals may comprise only packet networks, as demonstrated by a telephone call between call terminals 110 and 122, for example. In both cases, a portion of the communication path traverses a packet network. Completing a telephone call over a packet network may introduce the problems with network delay as described previously.

In general operation, assume call terminal 102 dials the telephone number for call terminal 118. Network 104 receives the telephone number and initiates a call connection. After a call connection is set-up, call terminal 102 may begin communicating audio information over network 104 to gateway 106. Gateway 106 may convert the audio information represented as circuit-switched signals into packets for transport over network 112. An example of signals communicated via a circuit-switched network may comprise Pulse Code Modulation (PCM) signals. Gateway 114 may receive the packets, often out of order due to the varying network delays experienced by the different packets, and reassembles them as they are received. The packets are then converted back to audio information represented as PCM signals, and the circuit-switched signals are conveyed through network 116 to call terminal 118.

In one embodiment, a telephone call similar to above may be completed without any portion of the audio information traveling over a circuit-switched network such as networks 104 and 116. For example, call terminal 110 may communicate audio information over a call connection with call terminal 122. Call terminal 110 may convert the analog audio signals into digital audio information, and place the audio information into packets. The packets may pass through networks 108, 112 and 120, until they reach call terminal 122. Call terminal 122 may reconstruct the audio information in the form of analog audio signals for conveyance to the listening party. In this case, the embodiments may be implemented in call terminals 110 and 122, for example.

As discussed previously, packets may arrive at gateways 106 and 114 with varying amounts of network latency and possibly out of order, a phenomenon sometimes referred to as "network jitter." Gateways 106 and 114 may utilize a JBM to compensate for the network jitter. The JBM may delay each incoming packet so that packets arriving later and out of order can be placed into the proper sequence prior to the conversion of the digital data to analog form. Gateways 106 and 114 in general, and the JBM in particular, may be discussed in more detail with reference to FIG. 2.

Figure 2:
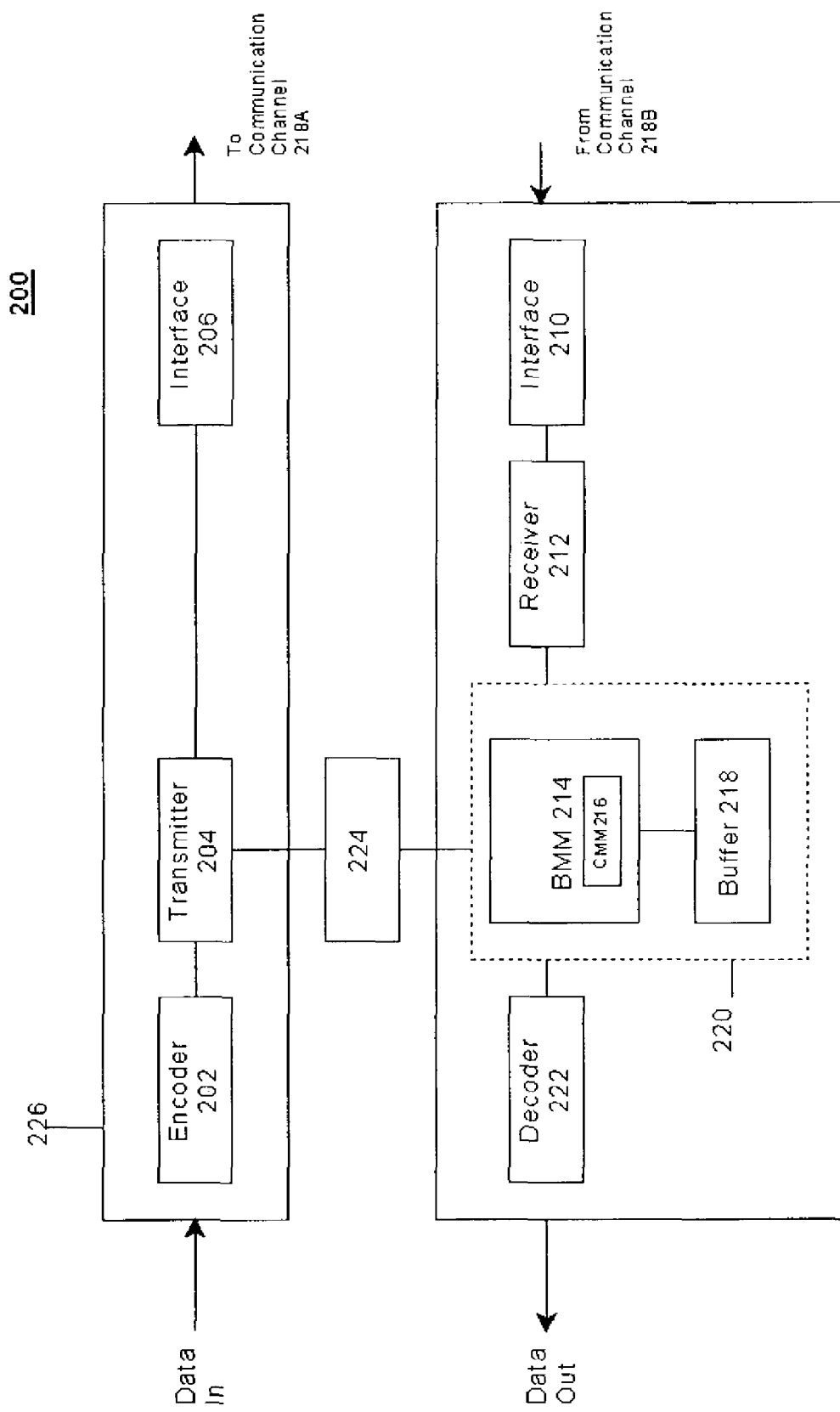
FIG. 2 illustrates a block diagram of a processing system in accordance with one embodiment.

FIG. 2 is a block diagram of a processing system in accordance with one embodiment. FIG. 2 may illustrate a processing system 200. Processing system 200 may implement functionality for the various embodiments as software executed by a processor, hardware circuits or structures, or a combination of both. The processor may be a general-purpose or dedicated processor. The processor may also be a specialized processor, such as a digital signal processor (DSP) with accompanying architecture, a network processor, embedded processor, micro-controller, controller and so forth. The software may comprise programming logic, instructions or data to implement certain functionality for an embodiment. The software may be stored in a medium accessible by a machine or computer-readable medium, such as read-only memory (ROM), random-access memory (RAM), magnetic disk (e.g., floppy disk and hard drive), optical disk (e.g., CD-ROM) or any other data storage medium. In one embodiment, the media may store programming instructions in a compressed and/or encrypted format, as well as instructions that may have to be compiled or installed by an installer before being executed by the processor. Alternatively, an embodiment may be implemented as specific hardware components that contain hard-wired logic for performing the recited functionality, or by any combination of programmed general-purpose computer components and custom hardware components.

In one embodiment, processing system 200 may implement some functionality for a gateway. Gateway 200 may be representative of, for example, gateways 106 and 114. Although this functionality is shown as part of gateways 106 and 114, it can be appreciated that this functionality can be implemented in any device connected to network 100, and still fall within the scope of the embodiments. For example, in the case of completing a telephone call between call terminals 110 and 122, processing system 200 may be implemented in call terminals 110 and 122 instead of gateways 106 and 114, respectively, as desired for a particular implementation.

In one embodiment, gateway 200 may comprise a transmitter module 226 and a receiver module 228. Transmitter module 226 may transmit audio packets over a packet network. Receiver module 228 may receive audio packets over a packet switched network. An example of packet networks may be networks 108, 112 and 120 of network 100, as represented by communications channels 230A and 230B.

In one embodiment, transmitter module 226 may include an encoder 202. Encoder 202 may perform compress the audio information to reduce the number of bits needed to represent the audio information. The encoder may be any type of voice coder, such as a G.726 Adaptive Differential Pulse Code Modulation (ADPCM) coder, a G.728 Low Delay Code-Book Excited Linear Predictive (LD-CELP) coder, G.729 Conjugate-Structure Algebraic Code-Book Excited Linear Predictive coder (CS-ACELP), G.723.1 Multi Rate Coder, and so forth. The embodiments are not limited in this context.

In one embodiment, transmitter module 226 may include a transmitter 204. Depending upon the physical transmission technique utilized, transmitter 204 may implement any one or more modulation techniques known in the art, such as phase shift keying (PSK), frequency shift keying (FSK), and so forth. The embodiments are not limited in this context. Transmitter 204 may transmit encoded packets to the packet network via a transmit interface 206. Transmitter interface 206 may represent, for example, the physical or logical connections to the packet network as represented by communications channels 230A and 230B. During the transmission process, each packet is time stamped using a time generated by timing device 224. The time stamped packets are then sent in sequence over transmit interface 206 to the packet network represented as communications channel 230A.

In one embodiment, receiver module 228 may include a receive interface 210 and receiver 212. Receive interface 210 may represent, for example, the physical or logical connections to the packet network represented by communications channel 230B. Receiver 212 may receive the encoded and modulated audio packets from communications channel 230B, and demodulates such information. Again, depending upon the physical transmission technique utilized, receiver 212 may implement any one or more demodulation techniques known in the art, such as PSK, FSK and so forth. The embodiments are not limited in this context.

In one embodiment, receiver module 228 may include a decoder 222. Decoder 222 may correspond to encoder 202 used by transmitter module 226 to encode the audio information. Decoder 222 may decode the encoded audio information into decoded audio information, and sends it to the next element of the system. For example, the decoded audio information may be sent to a digital-to-analog (D/A) converter (not shown) for conversion from digital audio information into analog audio signals for conveyance to the listener.

In one embodiment, receiver module 228 may include a JBM 220. JBM 220 may delay the incoming packets to recover the temporal pattern of the original audio information. To accomplish this, JBM 220 may further comprise, for example, a Buffer Management Module (BMM) 214 and a circular buffer 218.

BMM 214 may determine a packet delay value for each arriving packet in accordance with a particular jitter buffer algorithm. The packet delay value may refer to the amount of delay added to each arriving packet. Once the packet delay value is determined, BMM 214 may store the arriving packet in circular buffer 218 using the packet delay value. BMM 214 may also determine the read out location for circular buffer 218. The read out location may refer to a location in circular buffer 218 holding the next set of audio information to be sent to another component in the packet processing sequence, such as decoder 222, for example.

In one embodiment, BMM 214 may further comprise a Clock Compensation Module (CMM) 216. CMM 216 may assist BMM 214 in determining a packet delay value for each arriving packet by generating a clock differential value. The clock differential value may refer to the amount of clock differential between the transmitter clock and receiver clock. BMM 216 may calculate the clock differential value using statistical analysis. A statistical profile of network latencies may be constructed over time reflecting as precisely as possible the conditions of the network used for packet transport. An average packet delay value may be calculated based on the statistical profile, and the clock differential value may be derived by examining changes over time in the average packet delay value. This may be described in more detail below.

In general operation, assume call terminal 102 places a telephone call to call terminal 118. The analog audio information may be sent over network 104 to gateway 106. Gateway 106 may convert the PCM signals conveyed by network 104 into packets appropriate for packet network 112. Transmitter module 226 of gateway 106 may encode and transmit the packets over network 112. Further, the packets may be time stamped using timing signals from timing device 224 of gateway 106. Gateway 114 may receive the encoded audio packets from gateway 106 from network 112. Receiver module 228 of gateway 114 may receive the encoded audio packets with varying amounts of network latency. JBM 220 of receiver module 228 may compensate for the network latency to recover the temporal pattern of the original audio information. The delayed packets may then be sent to decoder 222 for decoding. The decoded audio packets may be converted back to PCM signals, and sent over network 116 to call terminal 118. The PCM signals may be played out for the listener of call terminal 118.

In one embodiment, JBM 220 may include circular buffer 218. A circular buffer may be an area of memory or a hardware buffer used to store a continuous stream of data by starting again at the beginning of the buffer after reaching the end. A circular buffer is usually written by one process and read by another. Separate read and write pointers are maintained. These are typically not allowed to pass each other otherwise either unread data would be overwritten or invalid data would be read.

In one embodiment, JBM 220 may compensate for the varying packet delay by storing the incoming packets in circular buffer 218. Circular buffer 218 may have a buffer length P, which may comprise one or more buffer locations. One or more buffer locations of circular buffer 218 may be used to form a jitter buffer, with the jitter buffer having a jitter buffer length N, where N is less than or equal to P. The buffer length N for the jitter buffer may be dynamically adjusted according to network conditions that vary over time. Buffer length may affect the overall latency and packet loss ratio for system 200. In order to minimize system latency, for example, it may be desirable to reduce the length of the jitter buffer. A longer buffer means a longer time that packets wait in the buffer before being conveyed. Thus, a longer buffer means that there will be a larger latency, which may be undesirable. If the buffer is made too small, however, later arriving packets may be lost. The buffer length for the jitter buffer may therefore be adjusted in accordance with varying network conditions.

In one embodiment, the buffer length for the jitter buffer may be dynamically adjusted using a histogram. A histogram may be used to represent the distribution of delay variations for a network. A receiver may experience an infinite number of network latency delay values associated with any given packet. A discretization process may be used to approximate the infinite number of delay values into a finite number of delay values. The discretization process may be represented as a histogram, with each bar of the histogram representing a particular discretization level and corresponding to a particular buffer location. The number of discretization levels may therefore determine the buffer length. The number of discretization levels may be determined in accordance with how fast the first-order and second-order statistics of the network change. As the discretization levels change the buffer length for the jitter buffer may change as well. The selection of discretization levels and corresponding buffer length may occur once during setup of the jitter buffer, or vary as network conditions change over time, depending upon a given implementation.

BMM 214 may dynamically adjust the length of the jitter buffer using updated delay information over the network. More particularly, BMM 214 may record the packet delays for all the incoming packets. BMM 214 may use the recorded delays to build and maintain a histogram of the frequencies of occurrence associated with each delay. BMM 214 may update the histogram plural times during a single delivery session. In one embodiment, BMM 214 may update the histogram in a recursive fashion, or it may be accomplished after the transmission of every Nth packet, where N is a finite number. Initially, a reasonable histogram representing a reasonable probability distribution function may be assumed based upon known characteristics of the network(s).

In one embodiment, BMM 214 may determine an appropriate packet delay value for each packet as that packet arrives for storage in the jitter buffer. More specifically, BMM 214 determines a packet delay value so that the packet delay value and the network latency for each packet will equal a fixed value. BMM 214 may build and maintain a histogram of packet delays based upon the delay experienced by each packet traversing the network. BMM 214 then dynamically updates the histogram for packet delays, and calculates an acceptable probability of packet loss. The acceptable probability of packet loss is compared to a packet loss percentage. If the acceptable probability of packet loss is less than the packet loss percentage, then the buffer length N is of an acceptable length. That is, the system dynamically calculates that all packets experiencing a network delay in excess of X shall be discarded, where X is updated based upon the histogram of packet delays. Arriving packets are then delayed upon arrival by an amount equal to X, the optimum latency, minus the delay that the packets experienced in traversing the network. Thus, each packet experiences the optimum latency, and if a packet experiences more than the optimum latency in traversing the network, it is discarded.

More particularly, as each packet arrives it is placed into the jitter buffer and delayed an amount of time $t_a$. The buffer delay $t_a$ is equal to the network delay experienced by that packet subtracted from the optimal delay, $t_{ed}$, that a packet may experience for a given probability of packet loss. Thus, each packet is given a customized delay at the receiver so that its total delay (e.g., network delay plus the buffer delay $t_a$) equals $t_{ed}$. Moreover, the optimal delay $t_{ed}$ dynamically adapts, in order to provide the shortest possible buffer latency for a given probability of error. The optimal delay $t_{ed}$ is also capped at a maximum latency $t_q$, to insure that the maximum permitted latency is not exceeded.

Figures 3A, 3B:
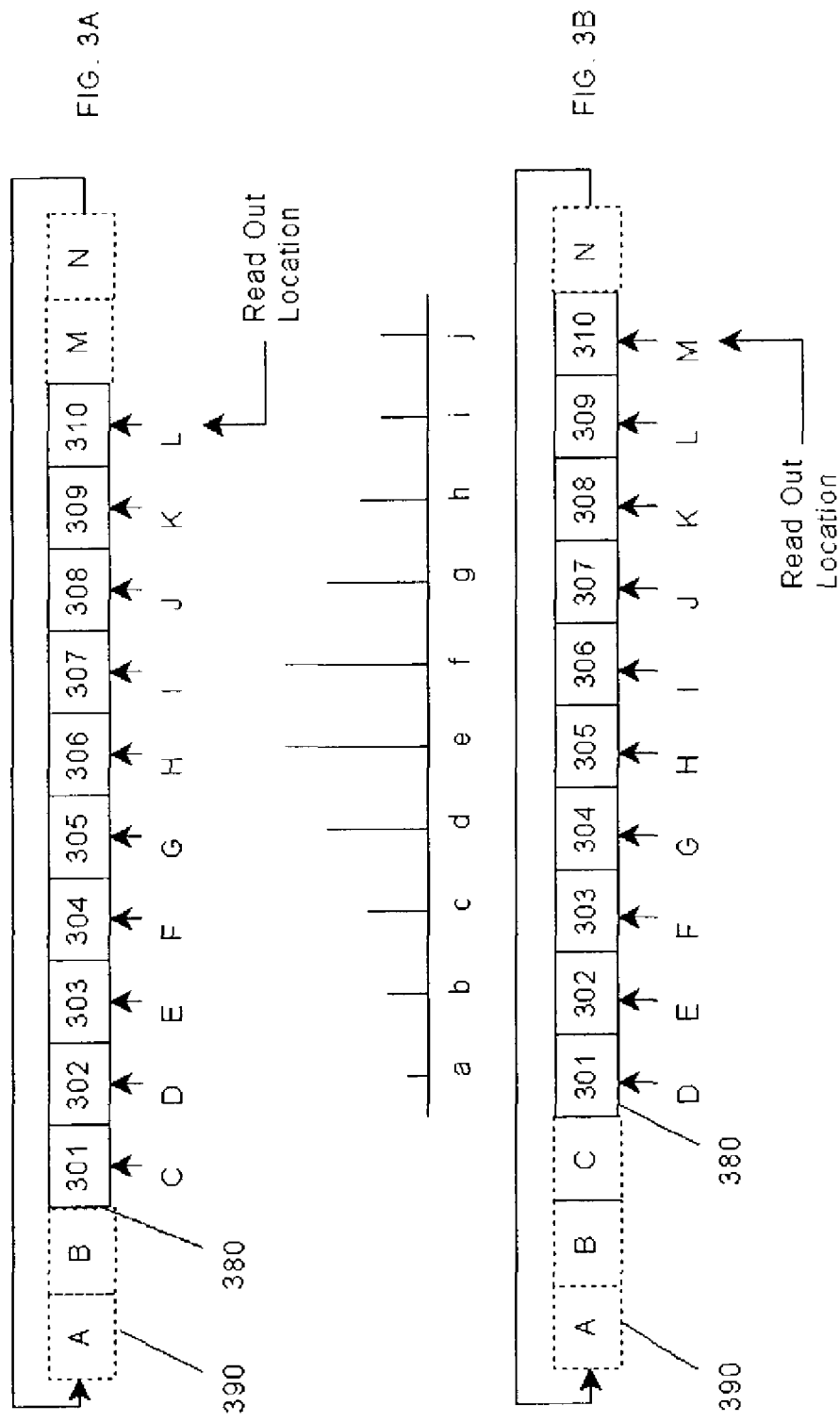
FIGS. 3A and 3B illustrate conceptual diagrams of a circular buffer in accordance with one embodiment.

FIGS. 3A and 3B illustrate conceptual diagrams of a buffer in accordance with one embodiment. FIGS. 3A and 3B illustrate a buffer 300 that may be representative of, for example, circular buffer 218. Buffer 300 may comprise multiple buffer locations, as represented by the letters A-N. The buffer locations represented by uppercase letters A-N may be collectively referred to as circular buffer 390. Buffer 300 may also comprise a jitter buffer, as represented by numbers 301-310. The buffer locations represented by numbers 301-310 are a subset of buffer locations A-N, and maybe collectively referred to as jitter buffer 380. Jitter buffer 380 may be used to store the packets arriving at system 200.

It can be appreciated that the length of circular buffer 390, and jitter buffer 380 which comprises a subset of buffer locations from circular buffer 390, are shown by way of example. The embodiments are not limited in this context. Since packet delay is random, a few packets would always be extremely early or extremely late. In practical application, therefore, the length of circular buffer 390 should be long enough to accommodate for the variations in network latency. This may result in a length for circular buffer 390 being several times the length determined for jitter buffer 380.

Above each of FIGS. 3A and 3B is a histogram showing examples of a probability distribution of network delays for a given network. As shown in FIGS. 3A and 3B, each bar of the histogram represented by lowercase letters a-j may correspond to a buffer location 301-310, respectively. The lowercase letters a-j do not necessarily correspond to the uppercase letters A-N used to denote circular buffer 390. FIGS. 3A and 3B may demonstrate the shifting of the jitter buffer, and thus bars of the histogram, along circular buffer 390 in response to clock differences. Each bar of the histogram may represent the frequency of a particular network delay. For example, according to the histograms shown in FIGS. 3A and 3B, the network delay represented by bars e and f may occur more frequently than the other network delays represented by the other letters.

In operation, BMM 214 may introduce delay for each packet by selecting a buffer location to place each arriving packet. For example, BMM 214 may place each arriving packet into a separate one of buffers 301-310. The buffers 301-310 are then shifted from left to right along jitter buffer 380 and the packets conveyed out to decoder 222. For example, an initial read out position for circular buffer 300 may be buffer 310, which occupies buffer location L of circular buffer 390. A packet which experiences a relatively short delay through the network may be placed relatively far to the left (e.g., location 302 or 303), whereas a packet that experiences a relatively long delay through the network will be placed closer to the right (e.g., 308 or 309). Thus, the shorter the delay through the network, the more to the left the packet will be placed. Because of the left to right shifting, this means that packets experiencing a short network delay will experience a longer delay in the receiving gateway's buffer since it will take longer to be shifted. This results in the total delay of all of the packets being substantially equal. It is worthy to note that this left to right shift of frames along jitter buffer 380 is different from the left to right shift of jitter buffer 380 along circular buffer 390, as discussed in more detail later.

In one embodiment, BMM 214 may select the appropriate buffer location for an arriving packet by examining the time stamp for the packet. The device initially transmitting the packet may place a time stamp on each packet indicating the time it was sent. For example, gateway 106 may transmit the packets and place a time stamp on each packet using a timing device, such as timing device 224. The device receiving the packets may retrieve the time stamp for the packet, and compare it to the time indicated by the receiver timing device. For example, gateway 114 may receive the packets and retrieve the time stamp from the packet, and compare the retrieved time stamp with a time derived from timing device 224 of gateway 114. The comparison may yield the network latency for the packet. The calculated network latency may then be subtracted from the optimal latency, and the resulting packet delay value may be used to select a location in jitter buffer 380 for storing a given packet.

Referring again to FIGS. 3A and 3B, if a packet experienced a relatively short delay through the network, it might be placed in location 302. Another packet, which experiences a relatively lengthy delay through the network, might be placed into location 310, which introduces a significantly shorter delay. Since the system designer knows in advance the amount of delay introduced by each rightward shift of the jitter buffer 380, the appropriate location for each packet can be calculated in order to ensure that the correct delay is introduced that effectively equalizes the total delay among the arriving packets.

In one embodiment, BMM 214 of JBM 220 may utilize CCM 216 to compensate for time differentials between the timing devices at the transmitting and receiving gateways. Since gateways 106 and 114 utilize two different timing devices, the timing devices may not be synchronized. Thus, the network delay calculated as described above may not represent an actual network delay, but a network delay relative to the network delay of other packets transmitted through the network. In the event of clock drift, the average difference between the sending clock and the receiving clock may increase or decrease over time, a phenomenon sometimes referred to as "clock drift." The clock drift is typically linear, and becomes more significant as a telephone call continues. The clock drift may cause the histogram to shift along the x-axis along the lined up locations of buffer 300. This may increase the number of packets dropped by BMM 218, and therefore may eventually affect the operation of JBM 220 without appropriate compensation.

In one embodiment, CCM 216 and circular buffer 218 may compensate for clock differentials between a transmitter timing device and a receiver timing device. As discussed previously, BMM 214 may record the packet delays for all the incoming packets and use the recorded delays to build and maintain a histogram of the frequencies of occurrence associated with each delay. BMM 214 may update the histogram plural times during a single delivery session. Clock drift may affect the histogram, which in turn may affect jitter buffer 380 aligning with the histogram. For example, assume that the clock drift increases over time. Each time BMM 214 updates the histogram, the additional clock drift will shift the histogram to the right towards read out location 310. Eventually, clock drift may cause the histogram to shift so much that JBM 220 cannot operate within the probability of packet loss percentage set for system 200.

In one embodiment, the histogram shift problem may be reduced using a circular buffer such as circular buffer 300. Referring again to FIGS. 3A and 3B, as clock drift causes the histogram to shift to the right, jitter buffer 380 may be shifted along circular buffer 390. As shown in FIG. 3A, jitter buffer 380 may originally occupy buffer locations C-L of circular buffer 390. As clock drift causes the histogram to shift to the right, the entire jitter buffer 380 may be shifted along circular buffer 390 to occupy buffer locations D-M, as shown in FIG. 3B. This may continue to occur until buffer location 310 reaches buffer location N of circular buffer 390, in which case buffer location 310 may move in the next shift to occupy buffer location A of circular buffer 390. In this manner, the histogram remains intact and cycles through circular buffer 390.

For example, assume that clock drifting causes the probability distribution of the histogram to shift to the right. As the probability distribution shifts to the right, packets having a network delay falling into bar j of the histogram may be dropped. This may in turn increase the packet loss percentage. To avoid this, jitter buffer 380 may be shifted to the right by one buffer location in circular buffer 390. This may be conceptually demonstrated by having buffer locations 301-310 of jitter buffer 380, which in turn correspond to bars a-j of the histogram, now correspond to buffer locations D-M of circular buffer 390. The result is that the histogram bars a-j are now associated with buffer locations D-M, respectively. As the histogram continues to shift to the right due to clock drift, the histogram continues to shift through circular buffer 390 ensuring that that the histogram remains intact.

As the histogram circulates through circular buffer 390, the read out position for the circular buffer also changes accordingly. For example, assume the read out position for jitter buffer 380 is the end of the jitter buffer represented by buffer location 310. As shown in FIG. 3A, buffer location 310 of jitter buffer 380 originally corresponds to buffer location L of circular buffer 390. Thus, the initial read out position with respect to circular buffer 390 is buffer location L. Once CMM 216 determines that a shift is needed, it must determine a new read out position to accommodate the changes in the histogram and associated buffer locations. This may be seen in FIG. 3B, where jitter buffer 380 has been shifted to the right one buffer location within circular buffer 390. The shift causes buffer location 310 of jitter buffer 380 to now correspond to buffer location M of circular buffer 390. Thus, the new read out position changes from buffer location L to buffer location M. In this manner, the same amount of delay associated with the histogram may be introduced to an arriving packet prior to reading out to another device.

CMM 216 may determine that a buffer shift and corresponding new read out position is needed by monitoring the histogram for changes in the average packet delay value. Clock differentials typically increase or decrease over time. Moreover, the clock differentials typically continue in the same direction in a linear manner. CMM 216 uses this information to evaluate the changes in the average packet delay values. CCM 216 may periodically examine the histogram to determine an average packet delay value. This may occur after each time the histogram is updated, for example. The update average packet delay value may be compared to previous average packet delay values to determine whether there is a pattern of linear increases in the average packet delay values. For example, if the average packet delay value increases from 100 ms to 150 ms, CMM 216 may determine that the change in average packet delay values is linear. Once a linear change is detected, CMM 216 may send a clock differential value parameter to BMM 214. BMM 214 may use the clock differential value parameter to reassign the buffer locations to the updated histogram, and also use it to select the read out location to read out the next buffer location to decoder 222.

The operations of systems 100 and 200 may be further described with reference to FIGS. 4-5 and accompanying examples. Although FIGS. 4-5 as presented herein may include a particular programming logic, it can be appreciated that the programming logic merely provides an example of how the general functionality described herein can be implemented. Further, each operation within a given programming logic does not necessarily have to be executed in the order presented unless otherwise indicated.

Figure 4:
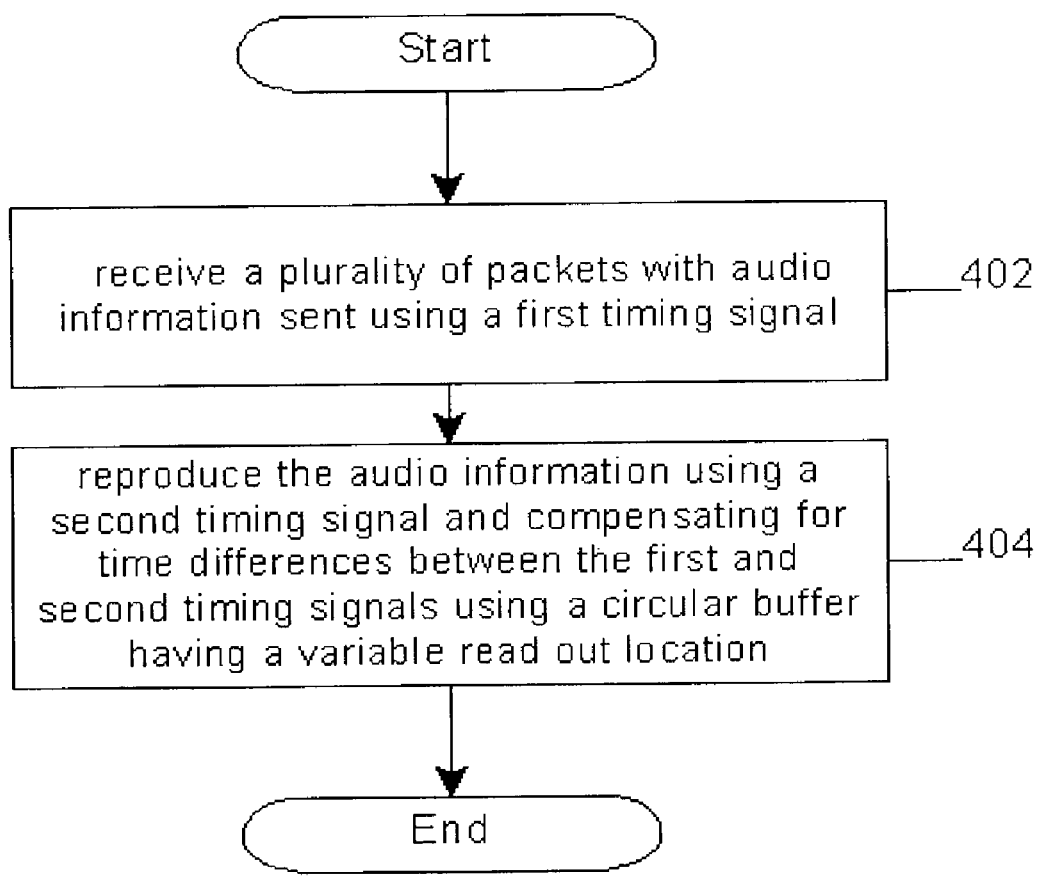
FIG. 4 is a first block flow diagram of the programming logic for a Jitter Buffer Module (JBM) in accordance with one embodiment.
Figure 5:
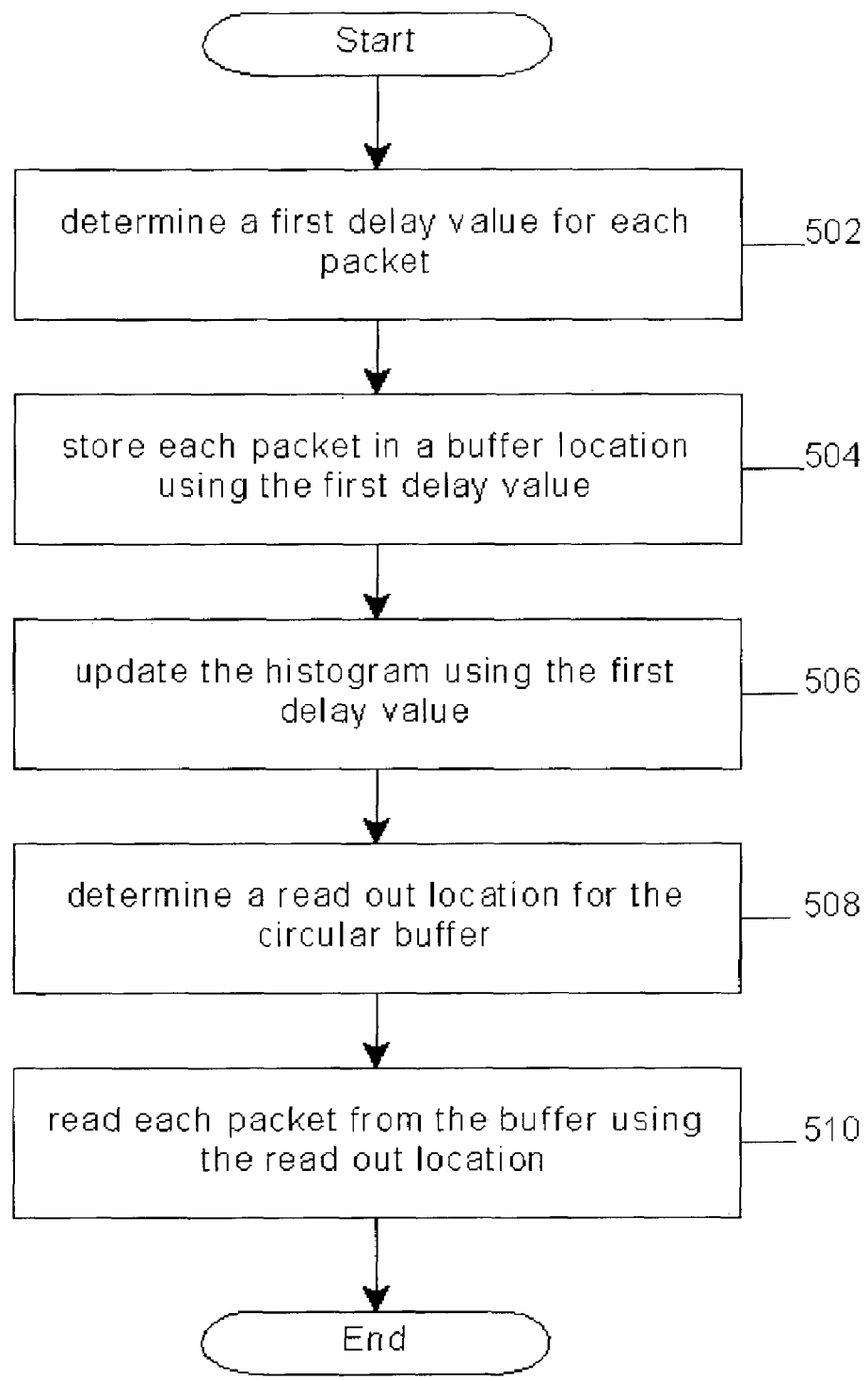
FIG. 5 is a second block flow diagram of the programming logic for a JBM in accordance with one embodiment.

FIGS. 4 and 5 illustrate a block flow diagram of the programming logic performed by a JBM in accordance with one embodiment. JBM and other modules may refer to the software and/or hardware used to implement the functionality for one or more embodiments as described herein. In this embodiment, these modules may be implemented as part of a processing system, such as processing system 200. It can be appreciated that this functionality, however, may be implemented by any device, or combination of devices, located anywhere in a communication network and still fall within the scope of the embodiments.

FIG. 4 illustrates a first programming logic 400 for a JBM in accordance with one embodiment. As shown in programming logic 400, a plurality of packets may be received at block 402. The packets may contain audio information, for example. The packets may have been sent using a first timing signal. An example of the first timing signal may be the timing device used by the transmitting network node. The audio information may be reproduced using a second timing signal at block 404. An example of the second timing signal may be the timing device used by the receiving network node. The receiving network node may compensate for any time differences between the first and second timing signals using a circular buffer having a variable read out location.

In one embodiment, the audio information may be reproduced by determining a first delay value for each packet. Each packet may be stored in a buffer location using the first delay value. A histogram may be updated using the first delay value. A read out location may be determined for the circular buffer. Each packet may be read from the circular buffer using the read out location.

In one embodiment, the first delay value may represent, for example, a network delay for the packet. The network delay for each packet may be determined by examining the time stamp for the packet. The time stamp represents a time as measured by the first timing device. The time stamp may be compared to a time as measured by the second timing device. The difference may be used to determine the network delay for a packet.

In one embodiment, each packet may be stored in a buffer location using the first delay value. This may be accomplished by determining a second delay value for each packet using the first delay value. The second delay value may represent, for example, a packet delay value. Each packet may be stored in a buffer location corresponding to the second delay value.

In one embodiment, the second delay value may be determined by retrieving a third delay value. The third delay value may represent, for example, an optimal latency value. The first delay value may be compared with the third delay value. The second delay value may be determined in accordance with the comparison.

In one embodiment, the histogram may be updated using the first delay value. The histogram may represent a probability distribution for a given set of network delays. More particularly, the histogram may comprise a plurality of levels with each level representing a frequency of network delay, and with each level corresponding to one of the buffer locations of the circular buffer. An initial histogram may be built for the receiver during the startup phase. The initial histogram may be based on some standard network assumptions and may be used to initialize the buffer. During operation, the network delays for the arriving packets may be used to update the histogram. In this manner, the histogram may reflect current network conditions, and incorporate the network conditions into a JBM, such as determining an optimal latency value, a packet delay value, buffer locations corresponding to the histogram, clock differential value parameters, compensation values, and so forth.

In one embodiment, the histogram may be updated in a manner that compensates for clock differentials. This may be accomplished by estimating a time difference between the first and second timing signals. The time difference may be compared to a threshold parameter. The histogram may be updated in accordance with results from the comparison. For example, in one embodiment the time difference may be greater than the threshold parameter. The histogram may be updated in accordance with the comparison by assigning each level a new buffer location within the circular buffer.

In one embodiment, the threshold value may represent a value that causes JBM performance to fall below acceptable VOP Quality of Service (QoS) standards. For example, assume that the QoS standards require the optimal latency to be less than 150 ms with an acceptable packet loss percentage of 5%. Further assume that the average packet delay value is 50 ms. As the average packet delay value increases over time due to clock drift, the average packet delay value may creep up to 150 ms and therefore cause the JBM to exceed the acceptable packet loss percentage of 5%. A threshold value of less than 150 ms may be set to reduce the possibility of this scenario occurring. For example, the threshold value may be set to 100 ms. If the time differential is greater than 100 ms, then the BMM may shift the histogram to the right in a circular manner, update the corresponding buffer locations for the shifted histogram, and select a new read out location.

More particularly, each level for the updated histogram may be assigned a new buffer location within the circular buffer. As the clock differential continues to move in a linear direction, the histogram may shift to the left or the right depending on whether the clock differential is increasing or decreasing, respectively. Once a linear change in the average packet delay value is detected, the histogram may be shifted in a circular manner. The associated buffer locations are updated in accordance with the shift.

In one embodiment, each level for the updated histogram may be assigned a new buffer location within the circular buffer in a circular manner. The circular buffer may include a jitter buffer having a start buffer location and an end buffer location. The histogram may have a start level and an end level. The start level may be the start of the distribution curve, while the end level may be the end of the distribution curve. Referring to FIG. 3A, the start of the distribution curve may be represented by bar a, and the end of the distribution curve may be represented by bar j, for example. Assume that the clock differential increases over time. In one embodiment, each level may be assigned a new buffer location by assigning the end level corresponding to the end buffer location to the next buffer location in the circular buffer. The remaining levels may be shifted by one buffer location towards said end buffer location. If we assume the clock differential decreases over time, the above process may be reversed to compensate for the clock drift in the other direction. The latter case is less of a problem than the former case, however, since network latency has a theoretical lower limit that cannot be exceeded.

Once the buffer associations are updated, the read out location for the circular buffer may be determined. The new read out location may be, for example, a buffer location corresponding to the end level or the end of the distribution curve.

In one embodiment, the time difference may be estimated by determining an average packet delay value for the plurality of packets using the histogram. The histogram may be updated on a periodic basis. The average packet delay values may be analyzed to detect a linear change in the values. If a linear change is detected, the time difference may be estimated using the linear change.

While certain features of the embodiments have been illustrated as described herein, many modifications, substitutions, changes and equivalents will now occur to those skilled in the art. It is, therefore, to be understood that the appended claims are intended to cover all such modifications and changes as fall within the true spirit of the embodiments.

The invention claimed is:

1. A method, comprising:
    receiving a plurality of packets with audio information sent using a first timing signal; and
    reproducing said audio information using a second timing signal and compensating for time differences between said first and second timing signals using a circular buffer with a variable read out location, said circular buffer being to store said packets in buffer locations in said circular buffer corresponding to frequencies of network delays.

2. The method of claim 1, further comprising building a histogram to represent a probability distribution for a given set of network delays, said histogram having a plurality of levels with each level representing a respective frequency of network delay, and with each level corresponding to a respective buffer location in said circular buffer.

3. The method of claim 2, wherein said reproducing comprises:
    determining a first delay value for each packet;
    storing each packet in a buffer location using said first delay value;
    updating said histogram using said first delay value;
    determining a read out location for said circular buffer; and
    reading each packet from said buffer using said read out location.

4. The method of claim 3, wherein said storing comprises:
    determining a second delay value for each packet; and
    storing each packet in a buffer location corresponding to said second delay value.

5. The method of claim 4, wherein said determining said second delay value comprises:
    retrieving a third delay value;
    comparing said first delay value with said third delay value; and
    determining said second delay value in accordance with said comparison.

6. The method of claim 5, wherein said first delay value represents a network delay, said second delay value represents a packet delay value, and said third delay value represents an optimal delay value.

7. The method of claim 3, wherein said updating said histogram comprises:
    estimating a time difference between said first and second timing signals; comparing said time difference to a threshold parameter; and
    updating said histogram in accordance with said comparison.

8. The method of claim 7, wherein said estimating said time difference comprises:
    determining an average packet delay value for said plurality of packets using said histogram on a periodic basis;
    analyzing said average delays for a linear change; and
    estimating said time difference based on said linear change.

9. The method of claim 8, wherein said time difference is greater than said threshold parameter, and updating said histogram in accordance with said comparison comprises assigning each level a new buffer location within said circular buffer.

10. The method of claim 9, wherein said circular buffer includes a jitter buffer comprising a subset of said buffer locations, with said jitter buffer having a start buffer location and an end buffer location, and said histogram has a start level and an end level, and said assigning comprises:
    assigning said end level corresponding to said end buffer location to a next buffer location of said circular buffer; and
    shifting said remaining levels by one buffer location towards said end buffer location.

11. The method of claim 10, wherein determining said read out location comprises determining a buffer location corresponding to said end level.

12. A system, comprising:
    a first wireless transceiver;
    an omnidirectional antenna to couple to said first wireless transceiver; and
    a jitter buffer module (JBM) connected to said first wireless transceiver, said JBM further comprising a Clock Compensation Module (CCM), said JBM also comprising a circular buffer with a variable read out location, said circular buffer being to store packets in buffer locations in said circular buffer corresponding to frequencies of network delays.

13. The system of claim 12, wherein said system further comprises:
    an encoder connected to said first wireless transceiver; and
    a first timing device connected to said encoder and said first wireless transceiver.

14. The system of claim 13, further comprising:
    a second wireless transceiver;
    an omnidirectional antenna to couple to said second wireless transceiver;
    a JBM connected to said second wireless transceiver, said JBM having a CCM; and
    wherein said second wireless transceiver further comprises a decoder connected to said second wireless transceiver, and a second timing device connected to said decoder and said second wireless transceiver.

15. The system of claim 14, wherein said JBM further comprises:

a Buffer Management Module (BMM) connected to said circular buffer.

16. The system of claim 15, wherein said CCM estimates a clock differential value between said first and second timing devices using an average packet delay value from a histogram representing a distributional curve of said frequencies of network delays, and sends said clock differential value to said BMM.

17. The system of claim 16, wherein said BMM receives said clock differential value from said CCM, and delays each packet a set amount of time using said clock differential value.

18. The system of claim 17, wherein in said circular buffer a subset of said buffer locations each corresponds to a level from said histogram.

19. The system of claim 18, wherein said BMM delays each packet by selecting a buffer location to store each packet.

20. The system of claim 19, wherein said BMM modifies which buffer location correspond to which level in accordance with said clock differential value.

21. An apparatus, comprising:
a receiver; and
a Jitter Buffer Module (JBM) connected to said receiver, said JBM further comprising a Clock Compensation Module (CCM) and a circular buffer with a variable read out location, said circular buffer being to store packets in buffer locations in said circular buffer corresponding to frequencies of network delays.

22. The apparatus of claim 21, wherein said JBM further comprises:
a Buffer Management Module (BMM) connected to said circular buffer.

23. The apparatus of claim 22, wherein said CCM estimates a clock differential value between a first and second timing devices using an average packet delay value from a histogram representing a distributional curve of said frequencies of network delays, and sends said clock differential value to said BMM.

24. The apparatus of claim 23, wherein said BMM receives said clock differential value from said CCM, and delays each packet a set amount of time using said clock differential value.

25. The apparatus of claim 24, wherein said circular buffer comprises a plurality of buffer locations to store audio information, with a subset of said buffer locations each corresponding to a level from said histogram.

26. The apparatus of claim 25, wherein said BMM delays each packet by selecting a buffer location to store each packet.

27. The apparatus of claim 26, wherein said BMM modifies which buffer location correspond to which level in accordance with said clock differential value.

28. An article comprising:
a storage medium;
said storage medium including stored instructions that, when executed by a processor, result in receiving a plurality of packets with audio information sent using a first timing signal, and reproducing said audio information using a second timing signal and compensating for time differences between said first and second timing signals using a circular buffer with a variable read out location, said circular buffer being to store said packets in buffer locations in said circular buffer corresponding to frequencies of network delays.

29. The article of claim 28, wherein the stored instructions, when executed by a processor, further result in performing said reproducing by determining a first delay value for each packet, storing each packet in a respective buffer location using said first delay value, updating said histogram using said first delay value, determining a read out location for said circular buffer, and reading each packet from said buffer using said read out location.

* * * * *